Figure 1:
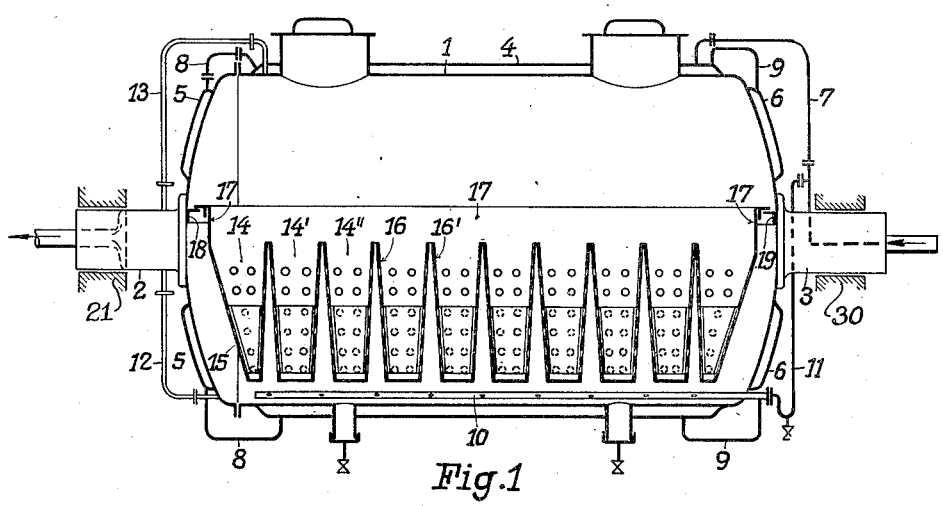

Sept. 11, 1934.   E. A. CLOSMANN   1,973,247
DEVICE FOR THE EXTRACTION AND STEAMING OF RAW UNROASTED COFFEE BEANS Filed April 2, 1932

Inventor:
Edward Adolph Closmann
By B Singer, atty.

Patented Sept. 11, 1934

1,973,247

UNITED STATES PATENT OFFICE 1,973,247

DEVICE FOR THE EXTRACTION AND STEAM-ING OF RAW UNROASTED COFFEE BEANS

Eduard Adolph Closmann, Leipzig, Germany, assignor to firm Quieta-Werke Alfred Kasper, Leipzig, Germany Application April 2, 1932, Serial No. 602,845
In Germany April 10, 1931

5 Claims. (Cl. 87—28)

The invention relates to devices for the treatment of raw unroasted coffee-beans by means of an extracting-liquid and steam, especially for the production of coffee from caffeine in which the beans rest on the screen-bottom of a drum rotated during the extraction. The drum is heated from without with the aid of a steam jacket. After the extraction steam can be blown into the drum for the purpose of blowing out the residue of extraction-liquid still adhering to the beans.

The known arrangements by which a horizontal screen lies near the bottom of the drum show different disadvantages. A principal disadvantage consists in the fact, that it is necessary to strongly heat the jacket of the drum with high-pressured steam in order to avoid the detrimental condensations on the front-surfaces of the extraction-drum; further, that the coffee-beans rest on the screen-bottom in a thick layer and consequently are unequally permeated by the steam which is conveyed into the drum and blows out the residue of the extraction-means from the beans so that an unequal and imperfect removal of the extraction-means from out of the coffee-beans ensues. This further means a prolongation of the steaming-time. The heating of the drum-jacket with highly pressured steam has the further disadvantage that the beans located in the neighbourhood of the heated wall are strongly dried even before the addition of the solvent, get a very hard skin and consequently are only difficult or belated accessible to the extraction-means.

It is true, there are also known for the treating of raw unroasted coffee-beans with steam drum-like containers in which the bean-mass is placed in separated perforated box like closed cases uniformly distributed in a container, so that each of these cases take up a certain quantity of the beans. But this arrangement does not serve for the treatment of the beans with an extraction-liquid and is also unfit for this purpose for want of the rotatability of the container and the free height of fall of the beans through the container during its rotation.

It is also difficult by the application of this apparatus solely for the treatment of coffee-beans with steam to lead the steam in such a way, that it passes through the cases themselves and streams past the cases.

It is the purpose of the improved extraction-device to do away with all these disadvantages.

The object of the invention consists in the feature, that instead of a horizontal screen-bottom on which the coffee-beans rest in a large layer, an especially formed screen-inset is employed which is formed from a series of screen-pockets lying side by side in the longitudinal and transversal direction of the drum the walls of which are perforated everywhere or provided with passing-slits. These screen-pockets may consist of metal, wire-gauze, cloth or the like. As far as the pockets are made of pliant material, they may be enlarged or reduced with means of the shifting of the pocket-frame. By these pockets the screen-surface is substantially enlarged, i. e., that surface through which the steam serving for the removal of the extraction-means acts on the coffee-beans.

Further the average layer through which the steam is obliged to permeate is essentially reduced by this improvement. It is further possible by this arrangement to do with less heating of the drum-jacket so that exhaust-steam respectively low-pressure steam can be used for this heating purpose, because as the result of the especial formation of the screen-inset and the steam-conduct the compact bean-mass may be uniformly and in a better way warmed thoroughly and gives no occasion for condensation. Also the large and formerly free surfaces of the drum as condensation-surfaces are done away in this improvement.

Figure 2:
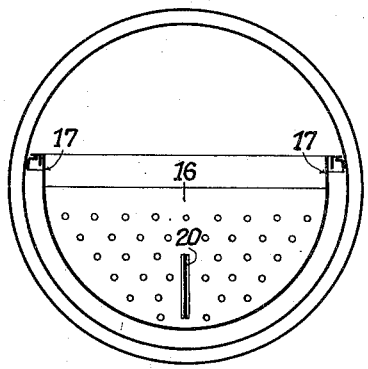

A preferred form of embodiment of the invention is illustrated by way of example in the accompanying drawing, of which Figure 1 is a longitudinal section. Figure 2 is a cross-section of the invention.

According to the drawing, 1 is the drum provided in the usual known manner with fixed end-journals 2 and 3 and is turnable by means of these end-journals in bearings 21, 30. The drum serves for the reception of the coffee and of the extraction-means which are introduced into it for the purpose of removing the caffeine. This drum is supplied along its jacket with a heating-mantle 4 and also with heating-chambers 5 on its front-surfaces. The introduction of the heating-steam which may be in this case exhaust-steam into the mantle-chamber 4 is carried out for instance by means of the steam-piping 7. The steam supply is led in well known manner through the central bore of the end journal 2, out of which the steam passing is lead at a point between the bearing 30 and the drum 1. The conduit 11 is connected with the pipe 7. From the mantle-chamber 4 the heating-steam can be conducted to the front-chambers 5 and 6 by the pipings 8 and 9. It is possible to blow steam into the drum 1 by means of a branch-pipe 11 out of the steam-piping 7, by a perforated pipe 10 arranged on the bottom of the drum.

The steam serves for the removal of the residuing extraction-means still in the beans. The blowing-out of the steams, the mantle-heating steam as well as the swathes of steam charged with the extraction-means, to the distillation-column may be carried out through the pipes 12 and 13. The exhausting of the steam takes place through a central bore of the hollow end channel 21.

The screen-inset according to the invention now consists of detached screen-pockets 14, 14', 14", etc., which are open on their upper sides and arranged side by side and the walls 15, 15' and 16 which are provided with holes or slits. These pockets extend about from the centre of the drum almost down to the bottom. The pockets are in their cross-section semi-circular. The pockets may be arranged separated and fixed on cheeks 17 by means of which they are suspended on the cross-bearers 18 and 19 on the front-walls of the drum. But they can also be constructed with the cheeks 17 of a single cohesive body. The coffee-beans are shot into these pockets, so that they fill up the pockets and cover over them up to a certain layer-height which reaches up to about the upper front-edge of the cheeks 17. In these pockets are suitably arranged partitions or between-sheets or pieces 20 serving for the dividing and for the purpose of taking along the coffee-beans by the rotation of the drum during the extraction.

The device works for example in the following manner: The screen-pockets of the drum are filled by pouring in beans. Thereupon the extraction-means is filled in eventually after a preceding steaming and the drum rotated or turned. After a semi-rotation of the drum the pockets are in the upper side thereof and in inverted position, so that the coffee beans drop out therefrom and fall to the bottom of the drum and on further partial rotation of the drum the beans fall back into the pockets, as will be understood. Hence during the rotation of the drum the coffee beans are continually being moved across the extraction-means, and the caffeine is hereby withdrawn from them.

After the extraction has been carried out for a sufficiently long time the extraction-means is allowed to escape. Then the outmantle is heated so that a formation of condense-water can no longer take place in the interior. Now steam is blown in through the pipe 10. The steam enters through the holes or slits of the screen-pockets and through the coffee piled up in them, thereby removing the residual extraction-means still contained in the coffee-beans. The swathing steams escaping through the pipings 12 and 13 are then led to the distillation-column.

What I claim is:
1. A device for the extraction and steaming of raw unroasted coffee-beans especially for the production of coffee free from caffeine comprising a rotatable drum provided with a heating jacket, and a screen-bottom in the drum for the beans to be heaped up, said screen-bottom comprising a series of screen-pockets, open on the upper side, arranged side by side in and transversely of the lower side of the drum and revoluble therewith.

2. A device for the extraction and steaming of raw unroasted coffee-beans especially for the production of coffee free from caffeine comprising a rotatable drum provided with a heating jacket, a screen-bottom in the drum for the beans to be heaped up, comprising a series of screen-pockets, open on the upper side, arranged side by side and suspended transversely in the lower half of the drum and revoluble therewith, the walls of the pockets being perforated.

3. A device for the extraction and steaming of raw unroasted coffee-beans especially for the production of coffee free from caffeine comprising a rotatable drum provided with a heating jacket, a screen-bottom in the drum for the beans to be heaped up, this screen bottom consists of a series of screen-pockets of semi-circular cross-section arranged side by side in the lower half of the drum and attached by means of common cheeks in cross-bearers of the front-walls of the drum, the walls of the pockets are uniformly perforated.

4. A device for the extraction and steaming of raw unroasted coffee-beans especially for the production of coffee free from caffeine comprising a rotatable drum provided with a heating jacket, a screen-bottom in the drum, this screen-bottom consists of a series of screen-pockets of semi-circular cross-section arranged side by side in the lower half of the drum and attached by means of common cheeks in cross-bearers of the front-walls of the drum, cross-pieces in the lower half of the pockets, by which the coffee-beans are taken along during the rotation, the walls of the pockets are uniformly perforated.

5. A device for the extraction and steaming of raw unroasted coffee-beans especially for the production of coffee free from caffeine comprising a rotatable drum provided with a heating jacket, a screen-bottom in the drum, this screen-bottom consists of a series of screen-pockets of semi-circular cross-section arranged side by side in the lower half of the drum and attached by means of common cheeks in cross-bearers of the front-walls of the drum, cross-pieces in the lower half of the pockets, adjustable walls in the screen-pockets for the purpose of the alteration of their capacity, the walls of the pockets are uniformly perforated.

EDUARD ADOLPH CLOSMANN.